Nov. 7, 1939.　　　　B. F. GREGORIC　　　　2,179,408

PNEUMATIC UNLOADER

Filed Sept. 9, 1937

Inventor
Brand F. Gregoric.
By Emerest B. Niem
Attorney

UNITED STATES PATENT OFFICE 2,179,408

PNEUMATIC UNLOADER

Brand F. Gregoric, Detroit, Mich., assignor to Pneumatic Truck Body Corporation, Detroit, Mich., a corporation of Michigan Application September 9, 1937, Serial No. 163,112

4 Claims. (Cl. 302—17)

This invention relates to pneumatic unloaders and the object of the invention is to provide a pneumatic unloader for trucks in which it is desired to deliver the load at a point some distance from the truck.

Another object of the invention is to provide a truck equipped with means for unloading the load and delivering the load at a distance from the truck such as, for instance, unloading a load of coal and conveying it across a lawn to the coal bin of a house.

A further object of the invention is to provide a pneumatic conveyer having a discharge nozzle through which the material is discharged and provided with return ducts leading back to the blower fan so that dust laden air is returned without being discharged into the house.

Another object of the invention is to provide a pneumatic unloader adapted to deliver any fairly small size material from a truck to a point at some distance from the truck.

A further object of the invention is to provide a truck having a hopper from which the material is fed to a pneumatic conveyer and the pneumatic conveyer providing a means for discharging the material at a point distant from the truck.

These objects and the several novel features of the invention are hereinafter more fully described and claimed and the preferred form of construction by which these objects are attained is shown in the accompanying drawing in which—

Figure 1:
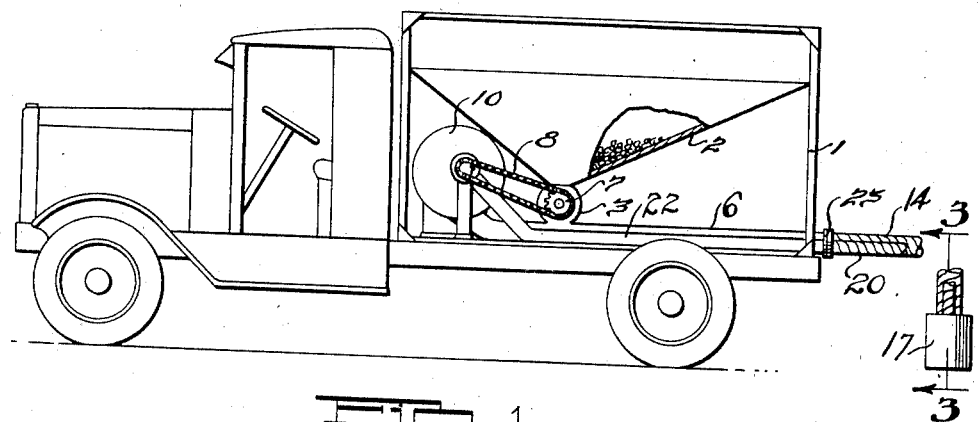
Fig. 1 is a side elevation of a truck equipped with my improved pneumatic unloader.
Figure 2:
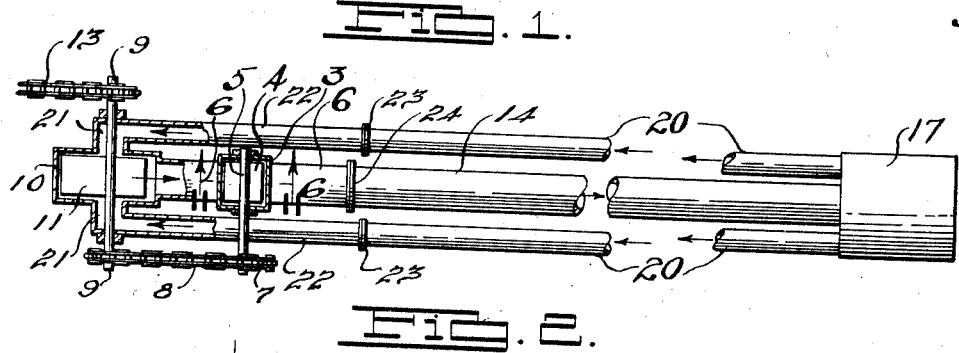
Fig. 2 is a plan view of the unloader with the blower and feed mechanism in section.
Figure 6:
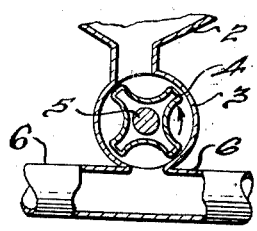
Fig. 6 is an enlarged section through the feed mechanism taken on line 6—6 of Fig. 2.

As shown in Fig. 1, the truck body 1 is provided with a hopper 2 having a sloping bottom and the material to be delivered is thrown into this hopper. At the bottom, the hopper 2 discharges into a cylinder 3 shown in Fig. 6 and a rotating feed member 4 is secured to the shaft 5 which is rotated to discharge the material into the air conduit 6. The end of the shaft 5 is provided with a sprocket 7 and a chain 8 connects this sprocket with a sprocket provided on the blower shaft 9 shown in Fig. 2. The blower comprises a casing 10 and the shaft 9 is provided with blower vanes 11 within the casing 10 which are adapted to blow air through the central conduit 6 shown in Fig. 2. The blower shaft is preferably driven by means of a power take-off mechanism from the engine of the truck and, as several different types of power take-offs are suitable for this purpose, the power take-off is not here illustrated, but the chain 13 shown in Fig. 2 is preferably driven from the power take-off and extends about a sprocket provided on the shaft 9 of the blower as shown in Fig. 2. Connected to the end of the conduit 6 is a flexible conduit 14 which, as shown in Fig. 5, consists of an inner flexible metal conduit 15 which is enclosed within the fabric or rubber conduit 14.

Figures 3, 4, 5:
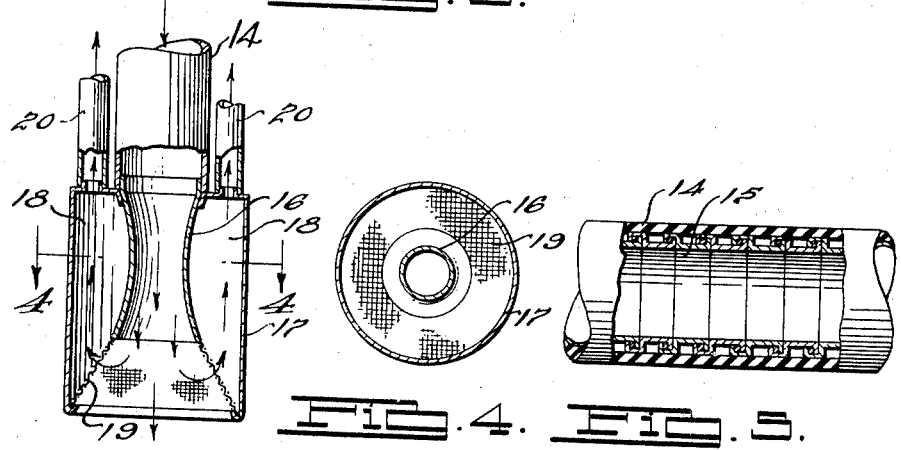
Fig. 3 is an enlarged section through the discharge nozzle taken on line 3—3 of Fig. 1.
Fig. 4 is a transverse section through the nozzle taken on line 4—4 of Fig. 3.
Fig. 5 is an enlarged section through the discharge conduit.

This conduit 14 discharges into a venturi 16 provided in the discharge nozzle and a casing 17 is provided thereabout forming an annular chamber 18 as shown in Fig. 3. From the end of the venturi 16 to the end of the casing 17 a frusto-conical screen 19 is provided and the return conduits 20 from the chamber 18 lead back to the intake ports 21 for the blower fan. The conduits 20 are also flexible between the nozzle and the end of the truck body so that the nozzle may be carried in any direction to the delivery point. The flexible conduits 20 are connected to the fixed return conduits 22 at the points 23 while the flexible conduit 14 is connected to the fixed conduit 6 at 24. The several conduits may be disconnected at the points 23 and 24 at the rear of the truck and may be placed on top of the load during hauling. When the load has reached its destination the flexible conduits are again connected in position as shown in Fig. 2 and the discharge nozzle is positioned at the unloading point. Several sections of the flexible conduit may be connected between the load and nozzle depending how distant the unloading point is from the truck. With the nozzle in position the blower shaft 9 is connected to be driven by the power take-off which rotates the blower and feeder. The feeder feeds the material into the conduit 6 while the blower blows air therethrough and through the conduit 14 to the discharge nozzle. From the conduit 14 the material passes through the venturi 16 and is discharged therefrom and the air is drawn back through the screen 19 and through the chamber 18 and back through the conduits 20 and 22 to the fan.

In this manner the air carrying the material is withdrawn from the discharge point to prevent the discharge of dust about in the atmosphere at the discharge point. With this device the nozzle may be moved around by hand to distribute the load evenly if desired and when the load has been unloaded the flexible conduits may be disconnected and put back in the truck, at which time the truck may be driven back for additional loads.

From the foregoing description it becomes evident that the device is very simple and efficient in operation, will not easily get out of order, provides a unique arrangement for delivering a load at a distance from a truck and provides a device which accomplishes the objects described.

Having thus fully described my invention, its utility and mode of operation, what I claim and desire to secure by Letters Patent of the United States is—

1. In a pneumatic unloader, a truck having a hopper, an air conduit beneath the hopper, feed mechanism between the hopper and air conduit adapted to feed the material from the hopper to the air conduit, a blower adapted to blow air through the air conduit, means for driving the blower and means connecting the blower with the feed mechanism whereby operation of the blower drives the feed mechanism, a venturi at the discharge end of the air conduit, a housing about the venturi and a return conduit leading from the housing back to the intake of the blower.

2. In a pneumatic unloader, a truck provided with a hopper, an air conduit beneath the hopper, means for feeding material from the hopper to the conduit, a discharge nozzle at the end of the conduit provided with a venturi, a housing about the venturi, a screen between the end of the venturi and the housing, a return conduit from the housing, a blower for blowing air through the air conduit, means for driving the blower, the return conduit from the housing being connected to the intake of the blower whereby the air is withdrawn from the material discharged through the air conduit and returned to the blower.

3. In a pneumatic unloader, a truck provided with a hopper, an air conduit beneath the hopper, means for feeding material from the hopper to the conduit, a discharge nozzle at the end of the conduit and having a venturi therein, a return conduit from the discharge nozzle adapted to withdraw air from the main conduit to the nozzle and return it to the blower.

4. In a pneumatic unloader, a truck having a hopper, a blower conduit beneath the hopper, a blower for blowing air through the conduit, means for feeding material from the hopper into the conduit, a flexible conduit connected to the first named conduit and having a discharge nozzle, a chamber about the discharge nozzle, a return conduit opening from the chamber and extending along the flexible conduit and blower conduit to the blower, said return conduit being arranged to withdraw air from the discharge end of the nozzle and return it to the blower.

BRAND F. GREGORIC.